(12) United States Patent
Venkatachalam et al.

(10) Patent No.: US 8,077,074 B2
(45) Date of Patent: Dec. 13, 2011

(54) NETWORKED WAVEFORM SYSTEM

(75) Inventors: Chandrasekaran Venkatachalam, Fort Collins, CO (US); Nitin Bharadwaj, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 240 days.

(21) Appl. No.: 12/387,845

(22) Filed: May 7, 2009

(65) Prior Publication Data
US 2010/0079330 A1 Apr. 1, 2010

Related U.S. Application Data

(60) Provisional application No. 61/051,003, filed on May 7, 2008.

(51) Int. Cl.
*G01S 13/95* (2006.01)
*G01S 13/12* (2006.01)
*G01S 13/00* (2006.01)

(52) U.S. Cl. ......... 342/59; 342/26 R; 342/104; 342/118; 342/134; 342/135; 342/137; 342/175; 342/195

(58) Field of Classification Search ....... 342/26 R–26 D, 342/27, 28, 59, 104–115, 175, 192–197, 342/118, 126, 134–137, 200–205
See application file for complete search history.

(56) References Cited

U.S. PATENT DOCUMENTS

| | | | | |
|---|---|---|---|---|
| 3,161,870 A * | 12/1964 | Pincoffs | ......................... | 342/59 |
| 3,618,088 A * | 11/1971 | Simpson, Sr. | .................... | 342/59 |
| 3,691,558 A * | 9/1972 | Hoard et al. | ..................... | 342/28 |
| 3,787,849 A * | 1/1974 | Sletten et al. | ................. | 342/196 |
| 3,787,850 A * | 1/1974 | Sletten et al. | ................. | 342/107 |
| 3,789,397 A * | 1/1974 | Evans | .............................. | 342/59 |
| 3,790,926 A * | 2/1974 | Pekau | ........................... | 342/105 |
| 3,795,911 A * | 3/1974 | Hammack | ..................... | 342/106 |
| 3,821,751 A * | 6/1974 | Loos | ................................ | 342/59 |
| 3,827,049 A * | 7/1974 | van Staaden et al. | ........... | 342/59 |
| 3,996,590 A * | 12/1976 | Hammack | ..................... | 342/107 |
| 4,347,513 A * | 8/1982 | Schindler | ........................ | 342/59 |
| 4,743,907 A * | 5/1988 | Gellekink | ........................ | 342/59 |
| 4,806,936 A * | 2/1989 | Williams et al. | .............. | 342/126 |
| 5,027,122 A | 6/1991 | Wieler | | |

(Continued)

OTHER PUBLICATIONS

International Application No. PCT/US2009/043186, International Search Report and Written Opinion, 9 pages, Oct. 20, 2009.

(Continued)

*Primary Examiner* — Bernarr Gregory
(74) *Attorney, Agent, or Firm* — Kilpatrick Townsend & Stockton LLP

(57) ABSTRACT

Certain embodiments provide a network waveform system that can include multiple radars disposed at different geographical positions within an environment. The multiple radars may be configured to transmit a network waveform. The network waveform may include multiple radar waveforms. Each radar waveform of the multiple waveforms may be transmitted by a specific radar of the multiple radars. The system can also include a computer system coupled with the multiple radars that can include a processor and a memory. The memory may be configured to store information including data received from the multiple radars, data processed by the processor, and processing code executable by the processor. The processing code may include instructions to receive output data from the multiple radars resulting from the transmitted network waveform instructions to jointly process the output data from the multiple radars to determine a measurement of the environment based on the network waveform.

22 Claims, 15 Drawing Sheets
(12 of 15 Drawing Sheet(s) Filed in Color)

U.S. PATENT DOCUMENTS

| | | | |
|---|---|---|---|
| 5,302,955 A | | 4/1994 | Schutte et al. |
| 5,351,053 A | * | 9/1994 | Wicks et al. .................. 342/202 |
| 5,381,156 A | * | 1/1995 | Bock et al. .................... 342/126 |
| 5,434,570 A | | 7/1995 | Wurman |
| 5,583,972 A | * | 12/1996 | Miller .......................... 342/26 D |
| 5,623,267 A | * | 4/1997 | Wurman ...................... 342/26 D |
| 6,064,331 A | * | 5/2000 | Avila et al. ....................... 342/59 |
| 6,204,804 B1 | * | 3/2001 | Andersson .................... 342/113 |
| 6,225,942 B1 | * | 5/2001 | Alon ................................ 342/59 |
| 6,377,204 B1 | * | 4/2002 | Wurman et al. ................ 342/59 |
| 6,954,404 B2 | * | 10/2005 | Herberthson ................... 342/59 |
| 7,728,759 B2 | * | 6/2010 | Tillotson et al. ............. 342/26 A |
| 2006/0238406 A1 | * | 10/2006 | Nohara et al. ................. 342/195 |
| 2008/0012755 A1 | | 1/2008 | Venkatachalam et al. |

OTHER PUBLICATIONS

Bharadwaj, Nitin et al., "Evaluation of First Generation CASA Radar Waveforms in the IP1 Testbed," IEEE, pp. 2742-2745, 2007.

Chandrasekar, V. et al., "Radar Design and Management in a Networked Environment," Proceedings of SPIE, vol. 4527, pp. 142-147, 2001.

Junyent, Francesc et al., "Salient Features of Radar Nodes of the First Generation NetRad System," IEEE, pp. 420-423, 2005.

McLaughlin, D., Presentation on "Weather Radar Technology Beyond NEXRAD," National Research Council, 98 pages, 2002.

* cited by examiner

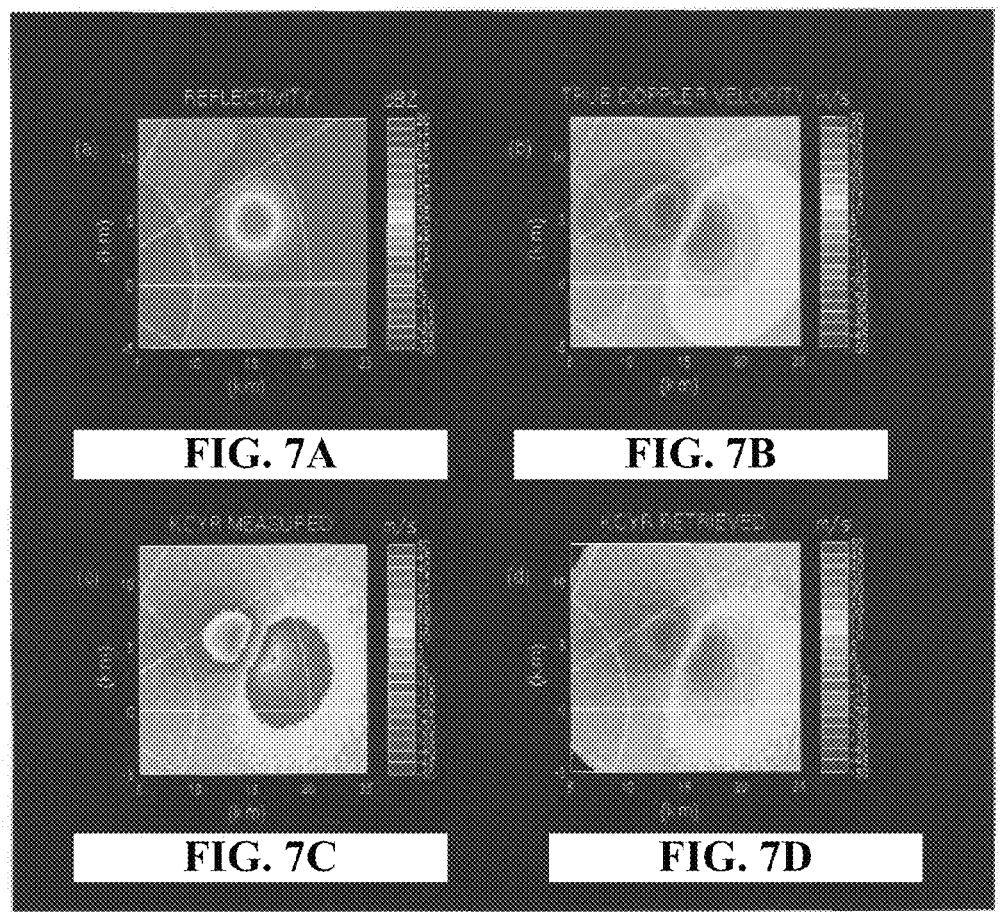

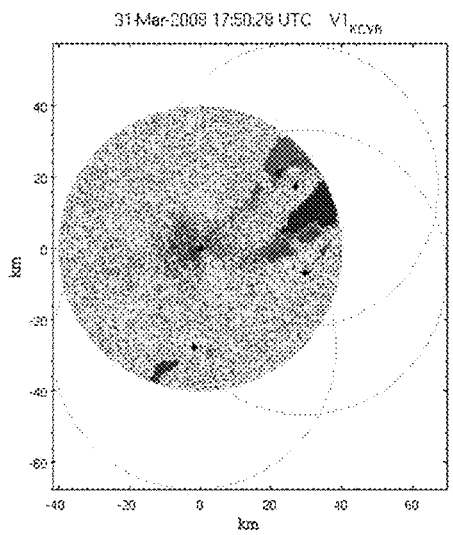 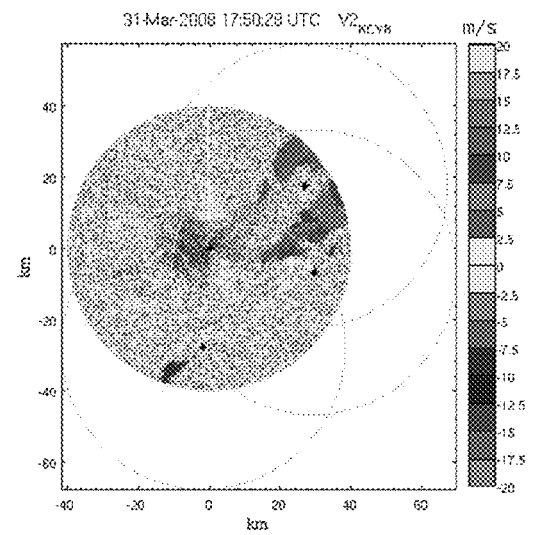
FIG. 14A  FIG. 14B
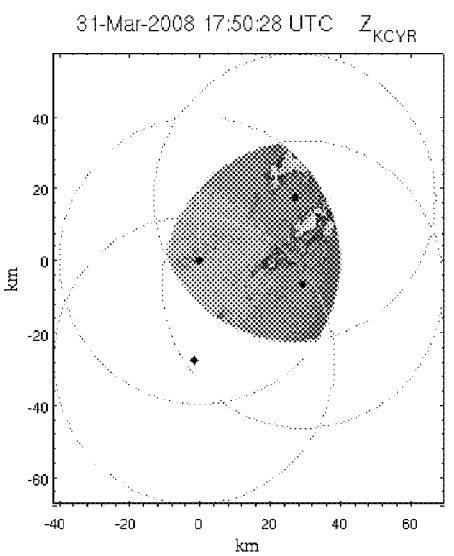
FIG. 14C
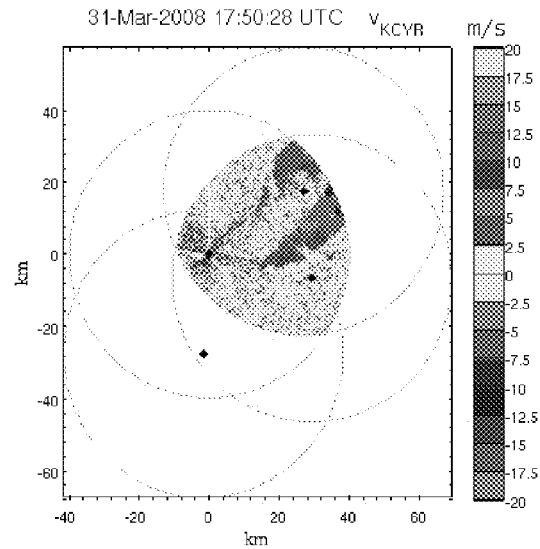
FIG. 14D

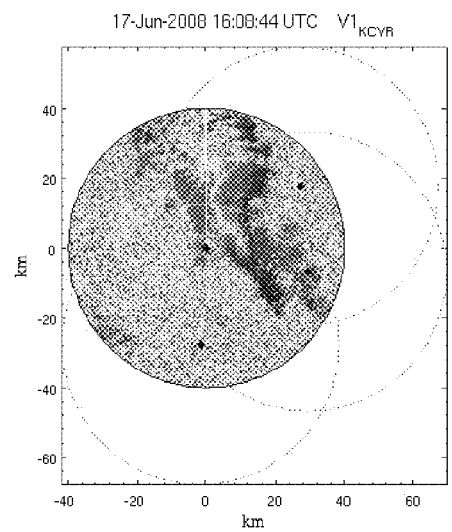 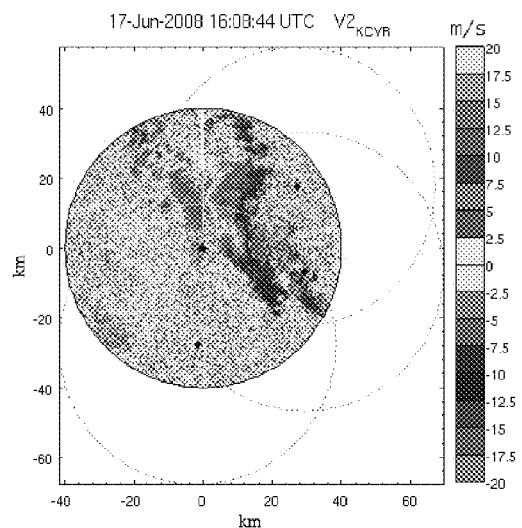
FIG. 15A  FIG. 15B

NETWORKED WAVEFORM SYSTEM

CROSS-REFERENCES TO RELATED APPLICATIONS

This application is a nonprovisional of, and claims the benefit of, U.S. Provisional Patent Application Ser. No. 61/051,003, entitled "NETWORKED WAVEFORM SYSTEM," filed May 7, 2008, the entire disclosure of which is incorporated herein by reference for all purposes.

STATEMENT AS TO RIGHTS TO INVENTIONS MADE UNDER FEDERALLY SPONSORED RESEARCH OR DEVELOPMENT

This invention was made with Government support through the National Science Foundation Engineering Research Centers Program, Grant No. ERC0313747.

BACKGROUND

This application relates generally to radar. More specifically, this application relates to methods, systems, and devices for resolving radar measurement ambiguities.

One of the fundamental objectives of meteorological radar systems is to sample the atmosphere surrounding the Earth to provide a quantitative measure of different weather phenomena, such as tornadoes. However, a monostatic Doppler radar transmitting pulses with uniform pulse repetition frequency may face a limitation on maximum unambiguous range and maximum unambiguous velocity based on the pulse repetition frequency and the radar's wavelength. There may be a trade-off between the maximum unambiguous range and the maximum unambiguous velocity, as their product may be fixed for a given wavelength. This trade-off may be even more stringent for shorter wavelength radars, such as X-band radars.

There is accordingly a general need in the art for improved methods and systems for operating radar arrangements to resolve radar measurement ambiguities.

BRIEF SUMMARY OF THE INVENTION

A networked waveform system for resolving radar measurement ambiguities is provided according to one embodiment. A network waveform system can include multiple radars disposed at different geographical positions within an environment. The multiple radars may be part of a networked radar system. The multiple radars may be configured to transmit a network waveform. The network waveform may include multiple radar waveforms. Each radar waveform of the multiple waveforms may be transmitted by a specific radar of the multiple radars. The system can also include a computer system coupled with the multiple radars that can include a processor and a memory. The memory may be configured to store information including data received from the multiple radars, data processed by the processor, and processing code executable by the processor. The processing code may include instructions to receive output data from the multiple radars resulting from the transmitted network waveform instructions to jointly process the output data from the multiple radars to determine a measurement of the environment based on the network waveform.

A method for resolving radar measurement ambiguities is also provided. The method includes transmitting multiple radar waveforms from multiple radars disposed at different positions within an environment. The method also includes receiving from the multiple radars output data resulting from the transmitted multiple radar waveforms. At least a subset of the output data may be aliased. The method also includes processing the output data from the multiple radars jointly. The method includes determining a dealiased measurement of the environment from the processed output data.

A networked radar system is also provided. The networked radar system includes transmitting means for transmitting a network waveform from multiple radar. The network waveform may include multiple radar waveforms. The networked radar system also includes receiving means for receiving output data from the multiple radars resulting from the transmitted network waveform. The networked radar system includes processing means for processing jointly the output data from the plurality of radars to determine a measurement of the environment.

A method of Doppler radar measurement is also provided. The method of Doppler radar measurement includes determining a velocity that is at least 100 meters per second using radar data from multiple radars. Each of the multiple radars is configured to provide radar data that can support velocity measurements less than 100 meters per second.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

FIGS. 7A-D show simulation results for a tornadic circulation feature based on a network waveform system simulation, in accordance with various embodiments.

FIGS. 14A-D show another view of the reflectivity and velocity observations, along with retrieved velocity for a networked/distributed waveform for a precipitation event on Mar. 31, 2008, in accordance with various embodiments.

FIGS. 15A-D show another view of the reflectivity and velocity observations, along with retrieved velocity for a networked/distributed waveform for a precipitation event on Jun. 17, 2008, in accordance with various embodiments.

DETAILED DESCRIPTION

Figure 1:
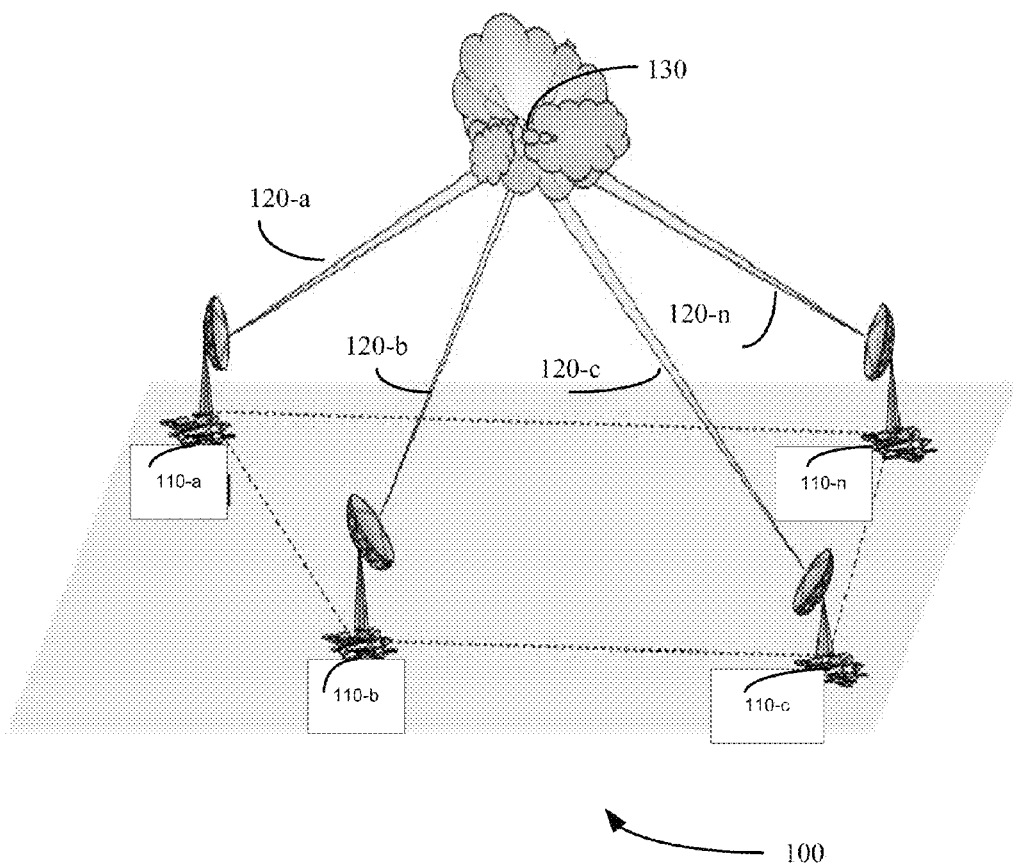
FIG. 1 shows a system of radars, in accordance with various embodiments.

A monostatic Doppler radar transmitting with uniform pulse repetition frequency ("PRF") may face a limitation on maximum unambiguous range ("$r_a$") and maximum unambiguous velocity ("$v_a$") determined by pulse repetition frequency ("PRF") and wavelength ("$\lambda$"). A maximum unambiguous range may be determined using an equation such as the following:

$$r_a = \frac{c}{2 \times PRF}$$

where c is the speed of light. PRF may be reciprocally related to a pulse repetition time ("PRT"). A maximum unambiguous velocity may be determined using an equation such as the following:

$$v_a = \frac{\lambda \times PRF}{4}$$

where $v_a$ may be referred to as a Nyquist velocity. There may be a conflicting tradeoff between $v_a$ and $r_a$ as their product is fixed for a given wavelength, represented by an equation such as the following:

$$v_a \times r_a = \frac{c \times \lambda}{8}.$$

This creates what is often called the range-Doppler dilemma. A PRF chosen to achieve large unambiguous range measurements may be a poor choice for achieving large unambiguous velocity measurements.

While there are several known methods for partially circumventing the range-Doppler dilemma using single Doppler radars, they may involve more sophisticated equipment at the radar. Furthermore, while using these methods may help circumvent the Doppler dilemma, they do not address other issues. For example, measuring high velocities (i.e. greater than 60 meter per second, or even 100 meters per second) may require transmitting at high frequencies. This typically requires more expensive equipment.

There is thus a need for methods, systems, and devices capable of dealing with the range and velocity ambiguity problem. In particular, there is a need for systems that can measure large velocities, while maintaining unambiguous range measurements and also utilizing existing low cost radar devices.

Certain embodiments thus provide tools and techniques to overcome the limitation of a single pulsed Doppler radar in resolving range and velocity ambiguities, along with allowing for high velocity measurements. Embodiments may include a networked waveform system that may use the principle that the underlying intrinsic properties of a precipitation medium, such as reflectivity and/or velocity, can remain consistent in a networked environment. The ambiguity in range and velocity may be resolved by jointly processing the measurements from a plurality of radars in a network to determine consistent measures of an environment across data from the plurality of radars.

A networked waveform system may offer many advantages, including, but not limited to, the following. First, it may decouple the range ambiguity and velocity ambiguity from each other, whereas range and velocity ambiguities are coupled together in a waveform for single radar. Second, a networked waveform (or distributed waveform) may be designed to measure velocities in excess of 60 m/s including velocities over 100 m/s. In some embodiments, a networked waveform may be designed without the need for complex waveforms and advanced processing at each radar node. This may minimize the computational load on each node. Third, a networked waveform may be used with low cost transmitters that may have limited ability to support complex waveforms as opposed to a significantly expensive single radar system with complex waveforms. Fourth, the networked waveform system may be designed to meet a specific requirement over the coverage region without being restricted by limitation of an individual radar node in the network. Fifth, a networked waveform may enable direct estimation of dealiased wind field, which may be used for kinematic analysis of storm structure.

The basic structure of an embodiment of a networked waveform system 100 is illustrated in FIG. 1. In this drawing, and in much of the discussion presented herein, the networked waveform system has a plurality of radars 110-*a*, 110-*b*, . . . , 110-*n*. System 100 shows four radars 110-*a*, 110-*b*, 110-*c*, and 110-*n*, for example. Illustrations using a specific number of radars are provided for exemplary purposes and are not intended to be limiting. It will be evident to those of skill in the art how to extend the methods and systems described herein to a system having an arbitrary plurality of radars.

System 100 shows that radars 110 may generate their own beams 120-*a*, 120-*b*, . . . , 120-*n* so that substantially simultaneous observations may be made of the same event in a resolution volume 130 by the different radars 110 in different geographical locations. For example, radial velocities may be measured by each of the radars 110 along the path of their respective beams 120. Measurements made by each radars 110 may be expected to be different, because each radar 110 measures along the direction of its respective beam 120. Furthermore, measurement at a position in an environment may contain data that actually pertains to a different point along the path of a beam 120. Or in the case of velocity measurements, aliasing may occur when a velocity higher than the maximum unambiguous velocity for a radar 110 may be folded or aliased with the measurement. However, the actual or intrinsic parameter, such as a vector velocity, will be the same for any given point or resolution volume in space, despite the measurements along separate beams 120 producing different values. A networked waveform system uses the principle that the underlying intrinsic parameters, such as velocity, of the environment remain consistent in a networked environment. Other measurements may be made along each beam 120, including, but not limited to, reflectivity measurements.

Radars 110 may communicate with a computer system (not shown). Radars 110 may communicate data to the computer system, where the data may be processed. Radars 110 may receive instructions from the computer system. A computer system may be located remotely and/or off site from the radars in some embodiments. A computer system may be coupled with a radar 110. Radars 110 may communicate with each other in some embodiments. Radars 110 may be part of a networked radar system. In a networked radar environment, N radar nodes may work collaboratively. The N nodes together may be considered as one system making measurements of the atmosphere.

Radars 110 may be of many different types and operate at different frequencies in different embodiments. Radars 110 may include radars that cover different frequency bands including, but not limited to following: S-band radars operating at frequencies of 2-4 GHz, correspond to wavelengths of about 9-15 cm; C-band radars operating at frequencies of 4-8 GHz, which corresponds to wavelengths of about 4-8 cm; X-band radars operating with frequencies of 8-12 GHz, which corresponds to wavelengths of about 2.5-4 cm; and K-band radars operating with frequencies of 12-40 GHZ, which corresponds to wavelengths of about 0.75-2.5 cm. In some instances, each of the radars 110 may operate at substantially the same frequency, but this is not a requirement, and in other instances, different radars may operate at substantially different frequencies. In one exemplary embodiment, radars 110 may include all X-band radars.

Radars 110 may include monostatic radars, which may include both transmitter and receiver components. Some embodiments may include radars 110 that may have multiple transmitters and/or multiple receivers. In one embodiment, a radar 110 may include two transmitters, with one for horizontal polarization and one for vertical polarization, and two receivers, with one for horizontal polarization and one for vertical polarization. Some embodiments may include radars 110 with analog receivers. Some embodiments may include radars 110 with digital receivers. Some embodiments may include radars 110 that may include a receiver, but not a transmitter. Some embodiments may include radars 110 that may include a transmitter but not a receiver. Some embodiments may have radars 110 that operate in modes such as bistatic receive mode or interferometric modes.

Radars 110 may include many different types of radars. Radars 110 may include Doppler radars. Radars 110 may have polarimetric capabilities, capable of controlling the polarization of the transmitted wave for each pulse and the received polarization states from the return of each pulse. Some radars may be single polarization or dual polarization capabilities. Merely by way of example, polarimetric radars may include the following without limitation: switched-dual polarization, dual-channel dual-polarization; and switched dual-channel, polarization-agile radar.

Radars 110 may have different capabilities. Radars 110 may include radars with minimal processing capabilities. Radars 110 may include radars with limited agility on duty cycle and supported waveforms. Radars 110 may include low cost radars. A radar with limited agility on duty cycle and ability to support complex waveforms may be referred to as a legacy radar. Merely by way of example, in one exemplary embodiment, radars 110 may include X-band magnetron radars. In some embodiments, radars 110 may include radars with advanced processing capabilities along with having more agility on duty cycle and ability to support complex waveforms. Radars 110 may include transmitters that include but are not limited magnetron, solid-state, klystron, traveling wave tube, and microwave power module transmitters.

Some embodiments may include radars 110 that may transmit single uniform pulse repetition frequency waveforms. Some embodiments may include radars 110 that transmit multiple pulse repetition frequency waveforms. In some embodiments, a subset of radars 110 may each transmit a waveform with at least two pulse repetition frequencies. Merely by way of example, a first radar 110-a may transmit a waveform with one PRF, a second radar 110-b may transmit a waveform with two PRFs, and a third radar 110-c may transmit a waveform with 3 PRFs. The pulse repetition frequency at which a radar 110 transmits may be the same for each radar in some embodiments. Some embodiments may include radars 110 that transmit waveforms with different pulse repetition frequencies from different radars 110. A networked waveform system may not require that different pulse repetition frequencies within a networked waveform be related as rational numbers (or common fractions) of the form $p/(p+1)$ where p is a nonzero positive integer, such as a 2 to 3 ratio, for example. Merely by way of example, a networked waveform may include pulse repetition frequencies of 1.6 kHz and 1.84 kHz.

Radars 110 may be part of a network of radars. A network of radars may sometimes be referred to as a networked radar system ("NETRAD"). A network of radars may include multiple radars distributed geographically. A networked radar system may include radars with overlapping coverage. The network of radars may be in communication with a computer system which may include processor and a controller. Controller may be used to send a network waveform (or distributed waveform) to the plurality of radars. A processor may be used to process data received from the network of radars. Radars 110 may be network controllable. In some embodiments, at least one radar 110 may include computer system functionality and/or be coupled with a computer system. A computer system that may be part of a system including a plurality of radars 110 is described in more detail below.

Figure 2:
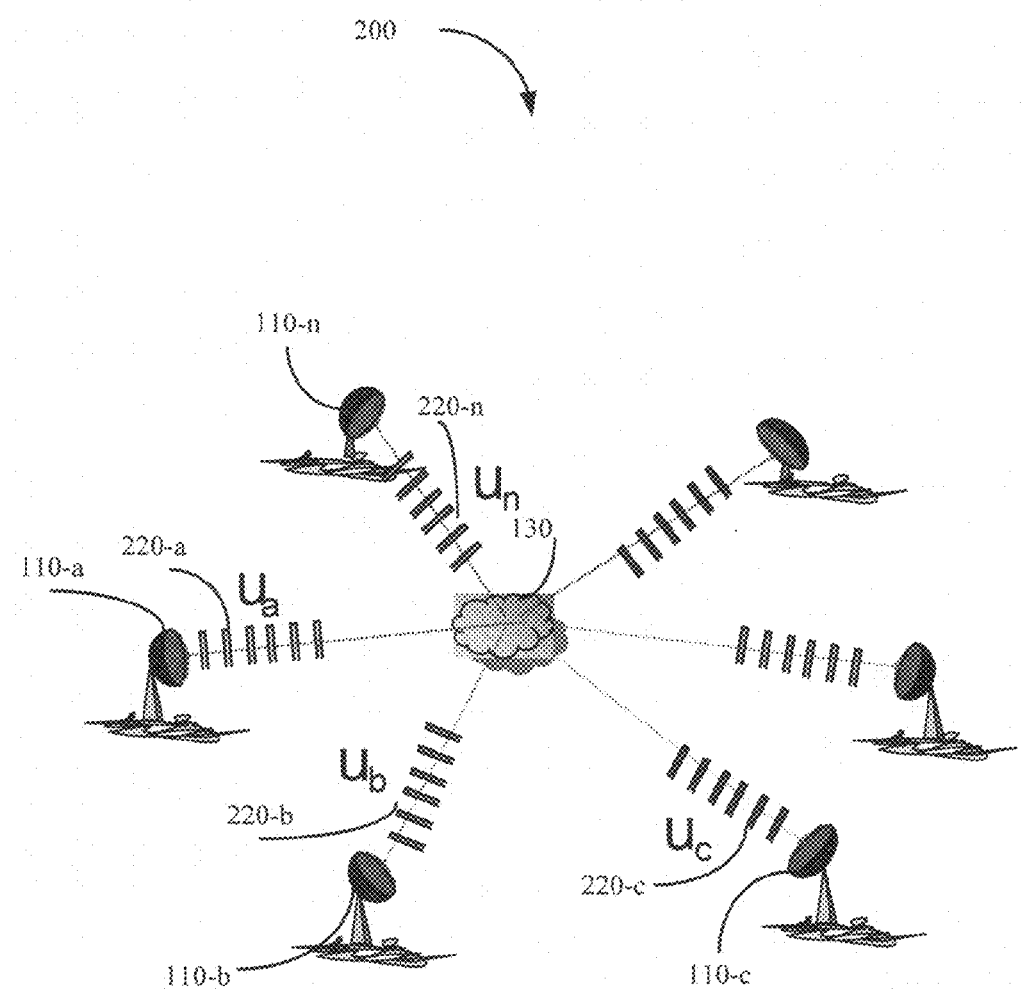
FIG. 2 shows a system of radars, in accordance with various embodiments.

FIG. 2 shows an embodiment of a system 200 of networked radars that may be an example of system 100. Each radar 110-a, 110-b, 110-c, . . . , 110-n is shown transmitting a radar waveform 220-a, 220-b, 220-c, . . . , 220-n. Each radar waveform 220 is shown directed at resolution volume 130. Signals from waveforms 220 may be scattered at resolution volume 130. A waveform such as 220-a may be backscattered at resolution volume to radar 110-a. In some embodiments, a waveform 220 that is scattered at resolution volume 130 may be received by other radars besides a radar which transmitted the waveform. Radar waveforms 220 may be considered part of a networked waveform U. A networked waveform U may include a collection of individual radar waveforms 220 associated with individual radars 110, while being considered a single networked waveform for the system. Radar waveforms 220 may each include a pulse repetition frequency. The pulse repetition frequency for each radar waveform 220 may be the same in some embodiments. In some embodiments, different radars 110 may transmit radar waveforms 220 with different pulse repetition frequencies. Some embodiments may include radars 110 that may transmit multiple waveforms. Some radars may transmit waveforms that include more than one pulse repetition frequency. Some embodiments may also involve transmitting other types of waveforms.

Figure 3:
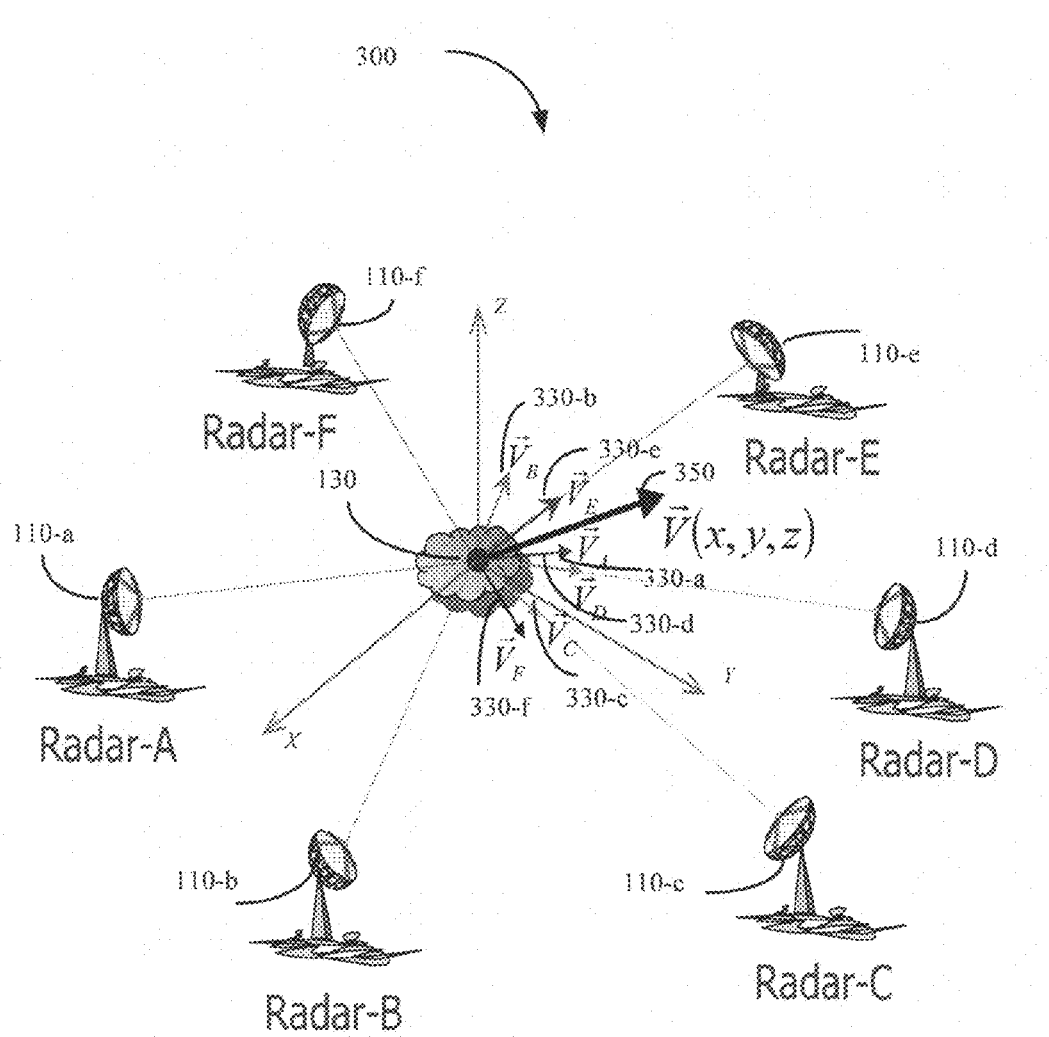
FIG. 3 shows a system of radars, in accordance with various embodiments.

FIG. 3 shows an embodiment of a system 300 including a plurality of radars 110 that may be an example of system 100. System 300 may be a networked radar system. In some embodiments, system 300 may be a networked waveform system. Radars 110-a, 110-b, ..., 110-f may be used to collect data to determine an associated radial velocity 330-a, 330-b, ..., 330-f at a resolution volume 130. Radial velocities 330 may be measured by comparing the phases of a transmitted waveform from a radar 110 and a backscattered signal at a radar 110. This may determine a Doppler velocity within a resolution volume 130 in the environment for each radar 110. Each radar 110 and its associated radial velocity 330 may point in a different direction. Using the systems, methods, and devices discussed in this application, an intrinsic velocity 350 for the resolution volume 130 may be determined based on the intrinsic property remaining consistent in the networked environment. In some embodiments, an intrinsic velocity 350 may be a two-dimensional velocity defined in a horizontal plane. In some embodiments, intrinsic velocity 350 may be a three-dimensional velocity. Merely by way of example, intrinsic velocity 350 for the resolution volume 130 may be determined such that when it is projected onto a beam direction for a radar 110, the resulting velocity may equal the radial velocity 330 for a radar 110. In some instances, radial velocities may include folding and/or aliased velocity information. By using measurements from a plurality of radars, an intrinsic velocity may be determined based on different techniques such as optimization, as will be discussed in more detail below.

In some embodiments, system 300 may also be used to make other measures of the environment for resolution volumes (e.g., resolution 130 shown in FIG. 1). Merely by way of example, reflectivities may also be measured. Using the systems, methods, and devices discussed in this application, an intrinsic reflectivity may be determined for resolution volume 130 in analogy with the discussion above with respect to velocity. Radars 110 may receive information pertaining to a reflectivity for resolution volume 130. An intrinsic reflectivity for resolution volume 130 may be determined based on the fact that the intrinsic reflectivity for the resolution volume 130 remains consistent for the resolution volume 130. While some reflectivity measurements for radars 110 may differ due to aliasing and/or folding of data from overlaid echoes, or other factors such as attenuation along a beam, an intrinsic reflectivity may be determined by jointly processing the data and determining a consistent reflectivity for the plurality of radar measurements. Second trip signal or overlaid echo may include unwanted echo that contaminates the data. This may occur because of signal received from previously transmitted pulses.

Figure 4:
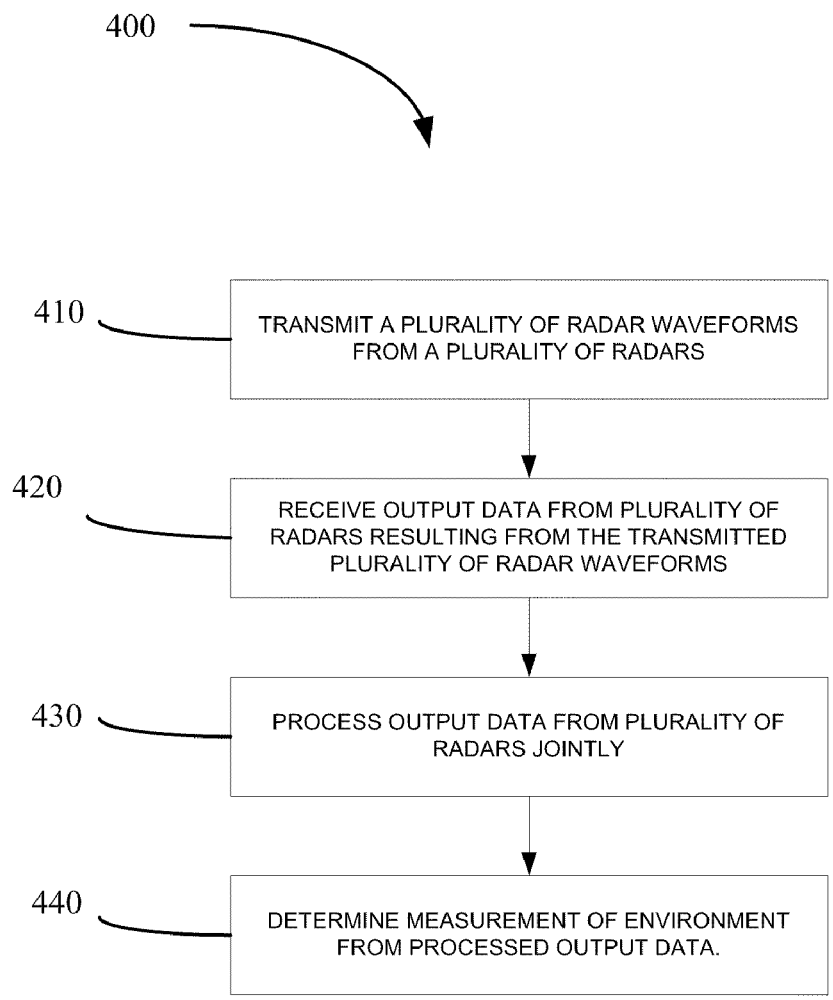
FIG. 4 shows a flow chart for determining measurements of an environment, in accordance with various embodiments.

Turning now to FIG. 4, an embodiment of a method 400 of utilizing a plurality of radars to resolve radar measurement ambiguities is described. Method 400 may be implemented on a system such as system 100 of FIG. 1.

At block 410, multiple radar waveforms may be transmitted from multiple radars. The multiple radars may be disposed at different positions within an environment. In some embodiments, the multiple radar waveforms may constitute a networked waveform. The multiple radars may be part of a networked radar system. A networked waveform may be referred to also as a distributed waveform in some embodiments. Each radar waveform may be transmitted by a specific radar of the multiple radars.

Radar waveforms may include a pulse repetition frequency. In some embodiments, a radar may transmit a single and/or multiple waveforms that may include additional pulse repetition frequencies. In some embodiments, each radar may transmit a waveform that include the same pulse repetition frequency. In some embodiments, one or more radars may transmit radar waveforms with different pulse repetition frequencies.

In some embodiments, method 400 may also include transmitting instructions to a plurality of radars to transmit specific radar waveforms. The transmitted instructions may include instructions to transmit a specific networked waveform. Some embodiments may involve specific networked waveforms that may be configured to make specific types of measurements. Merely by way of example, a specific networked waveform may be configured to targeted applications such as tornado detection, high winds, tracking, and hydrology. In one exemplary embodiment, a plurality of radar waveforms and/or a networked waveform may be configured in order to support measurements of wind velocities greater than certain values. Merely by way of example, a plurality of radar waveforms and/or a network waveform may be configured to provide radar data that may support velocity measurements greater than or equal to 60 m/s, 70 m/s, 80 m/s, 90 m/s, 100 m/s, 110 m/s, 120 m/s, 130 m/s, and/or 140 m/s. In one particular embodiment, velocity measurements as high as 100 m/s may be determined using a network waveform with a plurality of radar waveforms that individually may be able to support velocity measurements less than 38 m/s, but not higher velocities. In one particular embodiment, velocity measurements as high as 100 m/s may be determined using a network waveform with a plurality of radar waveforms that individually may be able to support velocity measurements less than 25 m/s, but not higher velocities. A plurality of radar waveforms and/or network waveform may be configured to support velocity measurements greater than or equal to these velocities, even though the individual radar waveforms or radars themselves may be unable to provide singular data that could support making such high velocity measurements.

In some embodiments, a networked waveform may be represented with an equation such as the following:

$$U(t)=[u_1(t) u_2(t) u_3(t) \ldots u_N(t)]$$

where $u_k(t)$ may be a $q_k \times 1$ vector representing the transmitted signal at the kth radar and each of the kth radars may have $q_k$ transmit waveforms. The dimension of networked waveform system M may be given by an equation such as the following:

$$M = \sum_{i=1}^{N} q_i$$

One skilled in the art will recognize that there are other mathematical ways of representing a networked waveform or plurality of waveforms that remains within the spirit of this invention.

The medium within the coverage of the networked radar system may be measured with the networked waveform U. The intrinsic properties of the medium may remain self consistent within measurements made with U. Measurements, including but not limited to velocities and reflectivities, made be made using the transmitted waveform U. Dealiased velocities at each radar using U may be determined for example, as will be discussed in other blocks of method 400.

At block 420, output data from a plurality of radars may be received, where the output data results from the transmitted plurality of radar waveforms. In some embodiments, the output data results from a transmitted networked waveform. In some embodiments, the output data may be considered a received signal and data products of individual radars from networked waveform. Output data may be raw data in some embodiments. Some embodiments may involve some processing of the data by some of the radars, depending on the capabilities of the radars and/or other factors, such as the processing that a computer system that receives all the output data will conduct. Output data may include data that may be pertinent to reflectivity measurements, such as received powers. Output data may include data that is pertinent to velocity measurements, such as data that may reflect a phase shift between a received backscatter signal compared to the phase of a transmitted signal, such as a radar waveform and/or a networked waveform. In some embodiments, it may be determined that the output data from a plurality of radars may be the result of transmitting a networked waveform.

In some embodiments, a computer system may receive the output data. A computer system may include processing code with instructions to receive output data from the plurality of radars resulting from a transmitted network waveform. A computer system that may be used in method 400 is described in more detail below.

Some embodiments may include output data that includes at least a subset of data that may be aliased. As discussed above, a single Doppler radar transmitting a waveform with a single pulse repetition frequency may determine an unambiguous range determined by an equation such as $$r_a = \frac{c}{2 \times PRF},$$

where c is the speed of light. Because of the periodic nature of pulse repetition frequency waveforms, data may be aliased or folded such that measured quantities in an environment that are separated by integer multiples of $r_a$ may not be differentiable using a single pulse repetition frequency. This may make the data measurements ambiguous. Similarly, maximum unambiguous velocity may be determined using an equation such as the following:

$$v_a = \frac{\lambda \times PRF}{4}$$

and folding and/or aliasing may occur if a transmitted radar and/or networked waveform makes a velocity measure of something moving faster than, $v_a$. The following blocks may process output data from the plurality of radars jointly in order to determine dealiased and/or unfold data to determine consistent measurements of an environment.

At block 430, output data from the plurality of radars may be processed jointly. A computer system, described below, may process the data jointly in some embodiments. Output data may be processed jointly to resolve ambiguities in the data. Output data may be processed jointly to determine a consistent measure of the environment. A consistent measure of the environment may reflect an intrinsic measure of the environment, such as an intrinsic velocity or an intrinsic reflectivity for a measured volume element and/or resolution volume in an environment. A consistent measurement of the environment may be an unambiguous measurement of the environment. Processing the data jointly may rely on knowing the plurality of transmitted radar waveforms and/or the networked waveform. Processing the output data and then determining a measure of the environment in block 440 may rely on the principle that the underlying intrinsic properties of the medium being measured, such as a reflectivity and/or velocity, remain consistent in a networked environment. A networked waveform may be configured to resolve the ambiguities of observations within a coverage region of the plurality of radars. Output data from the plurality of radars may also include location, range, beam direction, and/or timing information in order that data from different radars may be synchronized. Coherency across radars may also be maintained either through locking to a common GPS or by other means across the network. In some embodiments, output data may be processed to determine whether the output data is the result of a transmitted network waveform.

Merely by way of example, processing output data from a plurality of radars jointly may involve relating a Cartesian wind field to output data pertaining to measured Doppler velocities from the plurality of radars. A Cartesian wind field and measured Doppler velocities may be related to each other through an equation such as the following:

$$\begin{bmatrix} u(k) \\ v(k) \end{bmatrix} = (G^T G)^{-1} G^T C_k \hat{v}_k$$

where $C_k$ is a N×M combination matrix of rank p, N is the number of radars in the plurality of radars providing data for the measurement, M is the dimension of the networked waveform system or number of waveforms transmitted by the plurality of radars, $\hat{v}_k$ is a measured Doppler velocity vector, G is a geometric transformation relating the Cartesian wind field and the measured Doppler velocity at the plurality of radar nodes such as $$G = \begin{bmatrix} \sin\phi_1\cos\theta_1 & \cos\phi_1\cos\theta_1 & \sin\theta_1 \\ \sin\phi_2\cos\theta_2 & \cos\phi_2\cos\theta_2 & \sin\theta_2 \\ \sin\phi_3\cos\theta_3 & \cos\phi_3\cos\theta_3 & \sin\theta_3 \\ \ldots & \ldots & \ldots \\ \sin\phi_N\cos\theta_N & \cos\phi_N\cos\theta_N & \sin\theta_N \end{bmatrix}, \text{ and } \begin{bmatrix} u(k) \\ v(k) \end{bmatrix}$$

is a Cartesian wind field vector. $C_k$ may be a matrix whose elements are 0s and 1s. $C_k$ may be constructed by setting its elements to 1 or 0 based on the of N-tuples formed from columns of networked waveform U. p may be the total number of possible N-tuples from U. Since elements of $\hat{v}_k$ may be aliased velocities there can be large errors in u(k) (and v(k)).

The above system may be resolved for ambiguity by imposing network consistency. The velocity ambiguities may be resolved by directly estimating the wind fields. A solution may be obtained by solving an optimization problem such as the following:

$$\hat{w} = \underset{w}{\operatorname{argmin}} \|Gw - \hat{v}_k\|^2$$

$w = [u \ v]^T$ of is a wind vector whose elements are the velocity components in the horizontal plane and $\hat{w}$ is the retrieved wind velocity vector. The estimated wind velocity vector can be used to obtain the unfolded radial velocities at each radar node as given below:

$$\hat{v}_{unfolded} = G\hat{w}$$

In some embodiments, wind velocity vector $\hat{w}$ may be used in multi-Doppler analysis for studying the kinematics within storms. In some embodiments, a dealiased wind field may thus be determined, which may be used in some embodiments for kinematic analysis of storm structures. Some embodiments may use $\hat{v}_{unfolded}$ for detection of shear features that are associated with tornadoes.

Block 440 reflects that a measurement of the environment, such as $\hat{v}_{unfolded}$ and/or $\hat{w}$, may be determined from the processed output data. Other measures including but not limited to reflectivity measurements may also be made in some embodiments using the principle that the underlying intrinsic reflectivity of a medium at a volume element remains consistent in a networked environment.

Other methods for resolving ambiguities in order to determine consistent measures of an environment, such as velocities and reflectivities at a point in the environment. Merely by way of example, a variation on the method for resolving ambiguities in measured Doppler velocities may be found using modified Cartesian wind field that may be given by an equation such as the following:

$$\begin{bmatrix} u(k) \\ v(k) \end{bmatrix} = (G^T G)^{-1} G^T C_k (\hat{v}_k + Vn)$$

where V is the Nyquist correction elements ($2v_a$) obtained from the waveforms at each radar node and n is a vector of integers. A clustering problem may be solved using an equation such as the following:

$$\hat{n} = \arg \min_n \sum_{k=1}^{p} |u(k) - \bar{u}|^2$$

where $\bar{u}$ is a mean of u(k). The value of n that forms the closest cluster of points u(k) is a solution $\hat{n}$. Once solution $\hat{n}$ is obtained, a correct velocity may be obtained from the Nyquist correction elements. An unfolded velocity may be obtained as $v_{unfolded} = \hat{v}_k + V\hat{n}$.

These methods provide two examples of ways of resolving ambiguities in output data from a plurality of radars based on the principle that the underlying intrinsic properties of a medium such as reflectivity and velocity remain consistent in a networked environment. Other methods within the spirit of this invention may be used to determine consistent measures of the environment based on output data from a plurality of radars as one skilled in the art will recognize.

Figure 5:
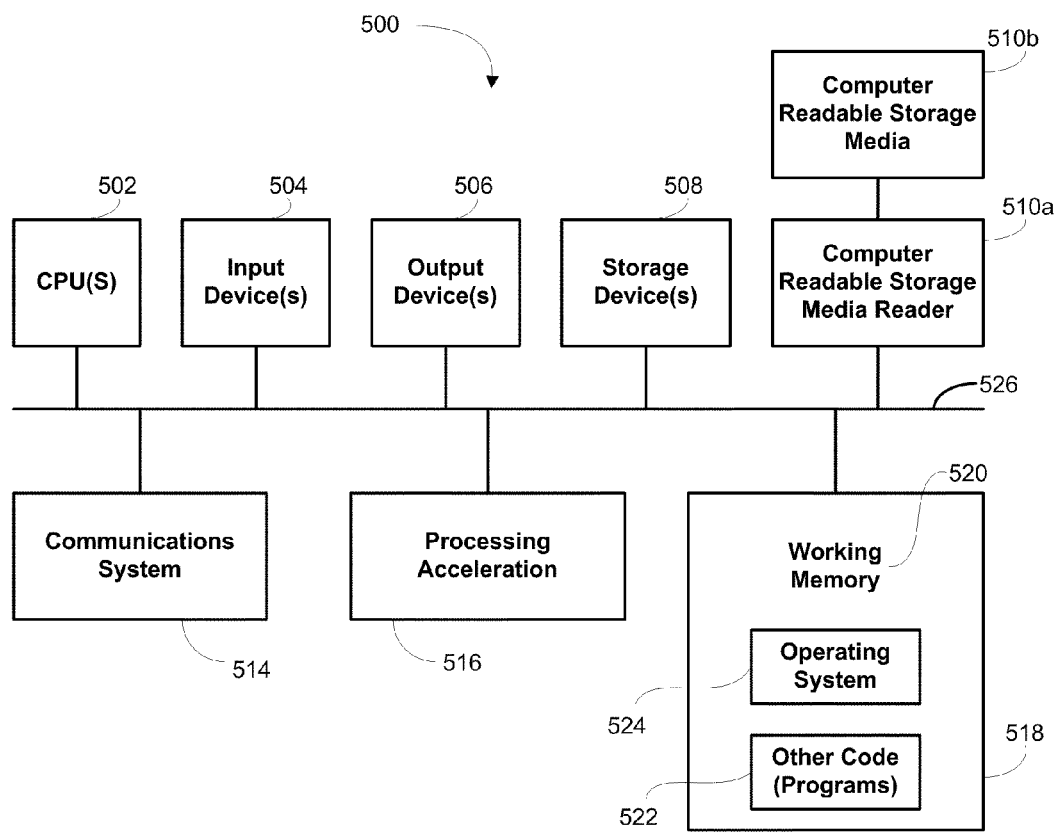
FIG. 5 shows a block diagram of a computer system that can be used to compute various aspects of the embodiments disclosed herein.

The methods and systems described in connection with method 400 and systems 100, 200, and 300 may be implemented in part by using a computer system 500 such as shown schematically in FIG. 5, which broadly illustrates how individual system elements may be implemented in a separated or more integrated manner. The system 500 is shown comprised of hardware elements that may be electrically coupled via bus 526. The hardware elements may include a processor 502, an input device 504, an output device 506, a storage device 508, a computer-readable storage media reader 510a, a communications system 514, a processing acceleration unit 516 such as a DSP or special-purpose processor, and a memory 518. The computer-readable storage media reader 510a may be further connected to a computer-readable storage medium 510b, the combination comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be collected from the radars. In some instances, such data collection may be performed in real time by the communications system in evaluating the intrinsic parameters of the environment.

The system 500 may also include software elements, shown as being currently located within working memory 520, which may include an operating system 524 and other code 522, such as a program designed to implement methods of the invention. Merely by way of example, system 500 may include processing code that may include instructions to receive data from multiple radars and to jointly process the data to determine a measure of the environment. In some embodiments, processing code may include instructions to determine a consistent measurement from the data from the multiple radars. In some embodiments, processing code may dealias and/or unfold the data from multiple radars. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Specific simulations and actual tests have been performed by the inventors to evaluate the performance of networked waveform systems, which are described next. Additional embodiments may be found in the following description.

Figure 6A:
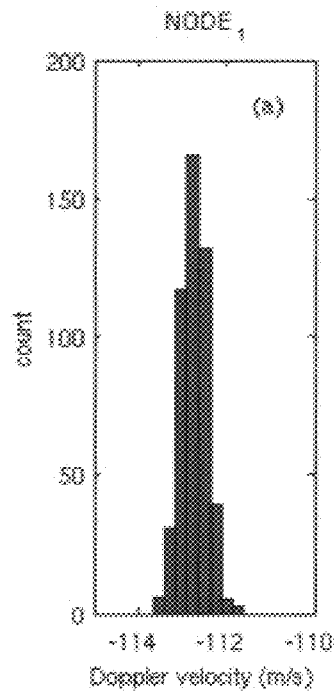
FIGS. 6A-F show simulated Doppler velocities based on a simulation of a networked waveform system, in accordance with various embodiments.
Figure 6B:
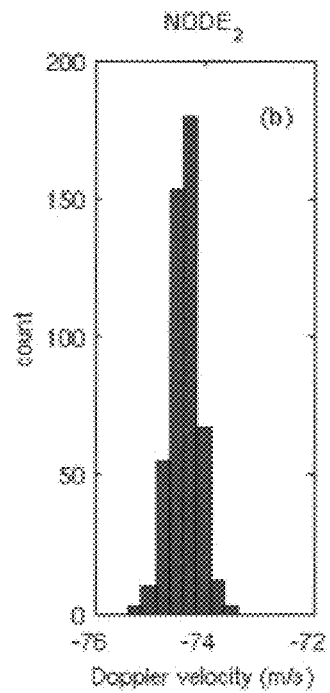
Figure 6C:
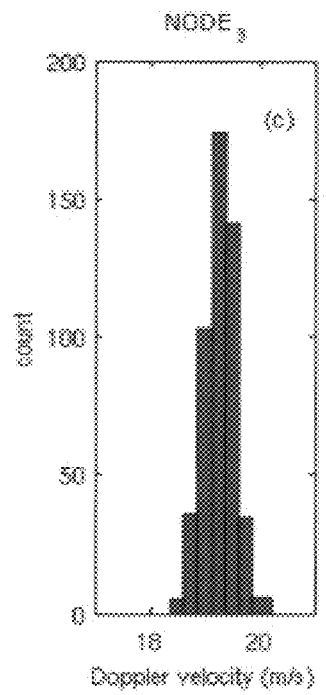

A simulation was set up with a network of three radars, in accordance with various embodiments. In FIGS. 6A-C, histograms of Doppler velocity estimated with the networked waveform system designed to measure very high winds are shown for one embodiment. The Doppler velocity measured is greater than 100 m/s (>220 mph) for a three node radar network with a resolution volume with 30 dBZ magnitude. In this simulation, velocities as high as 113 meters per second are measured. Yet the maximum measurable Doppler velocities of the individual radars in FIG. 6A-C may be less than 25 meter/second. The configuration for the networked waveform to measure high velocity included a networked waveform U with $u_1$ at KCYR, $u_2$ at KSAO and $u_3$ at KRSP, where $u_1$ waveform is 1.6 kHz and 2.08 kHz pulse repetition frequency, $u_2$ waveform is 1.76 kHz and 2.24 kHz, and $u_3$ waveform is 1.92 kHz and 2.4 kHz, where the simulation radar locations are further described next.

Figure 6D:
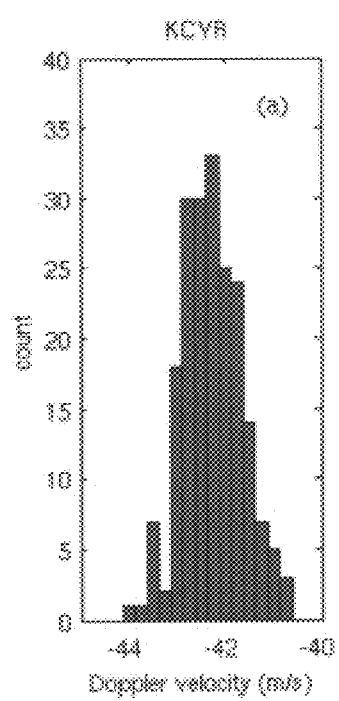
Figure 6E:
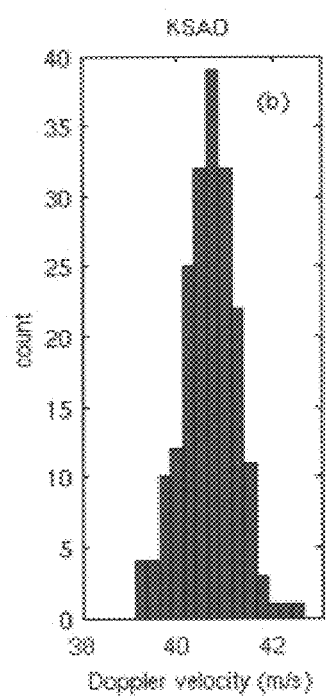
Figure 6F:
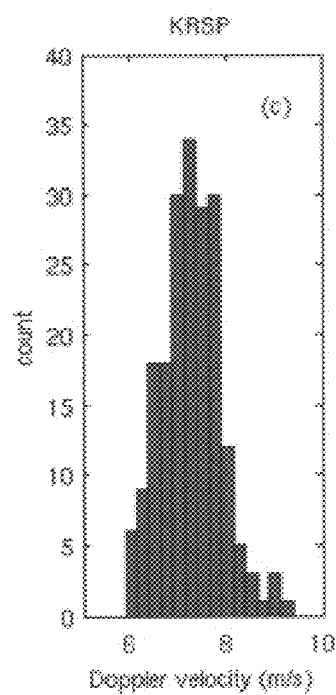

FIGS. 6D-F show histograms of Doppler velocities from a networked waveform system designed for low cost transmitters that are unable to support complex waveforms for one embodiment. The simulations were carried out for current Center for Collaborative Sensing of the Atmosphere ("CASA") IP-1 radar locations of Cyril ("KCYR"), Chickasha ("KSAO"), and Rush Springs ("KRSP") in southern Oklahoma, at a spectral width of 4 m/s and it can be observed that velocities greater than 40 m/s may be measured. FIG. 6D shows a histogram of Doppler velocities estimated from a networked waveform system at Cyril location. FIG. 6E shows a histogram of Doppler velocities estimated from a networked waveform system at Chickasha location. FIG. 6F shows a histogram of Doppler velocities estimated from a networked waveform system at Rush Springs location.

FIGS. 7A-D show a simulated tornado circulation feature observed by a network of magnetron radar systems with limited agility of the transmitter for one embodiment. The retrieved Doppler velocity at Cyril radar matches the true velocity without any folding in excess of 40 m/s while the measured velocity shows a lot of folding. The figures show simulation results for tornadic circulation feature 60 km away from Cyril. FIG. 7A shows simulation results for reflectivity measured at Cyril radar. FIG. 7B shows simulation true Doppler velocity at Cyril radar. FIG. 7C shows simulation measured Doppler velocity at Cyril. FIG. 7D shows a simulated Doppler velocity retrieved at Cyril using networked waveform system.

Figures 8A, 8B, 8C, 8D, 8E, 8F:
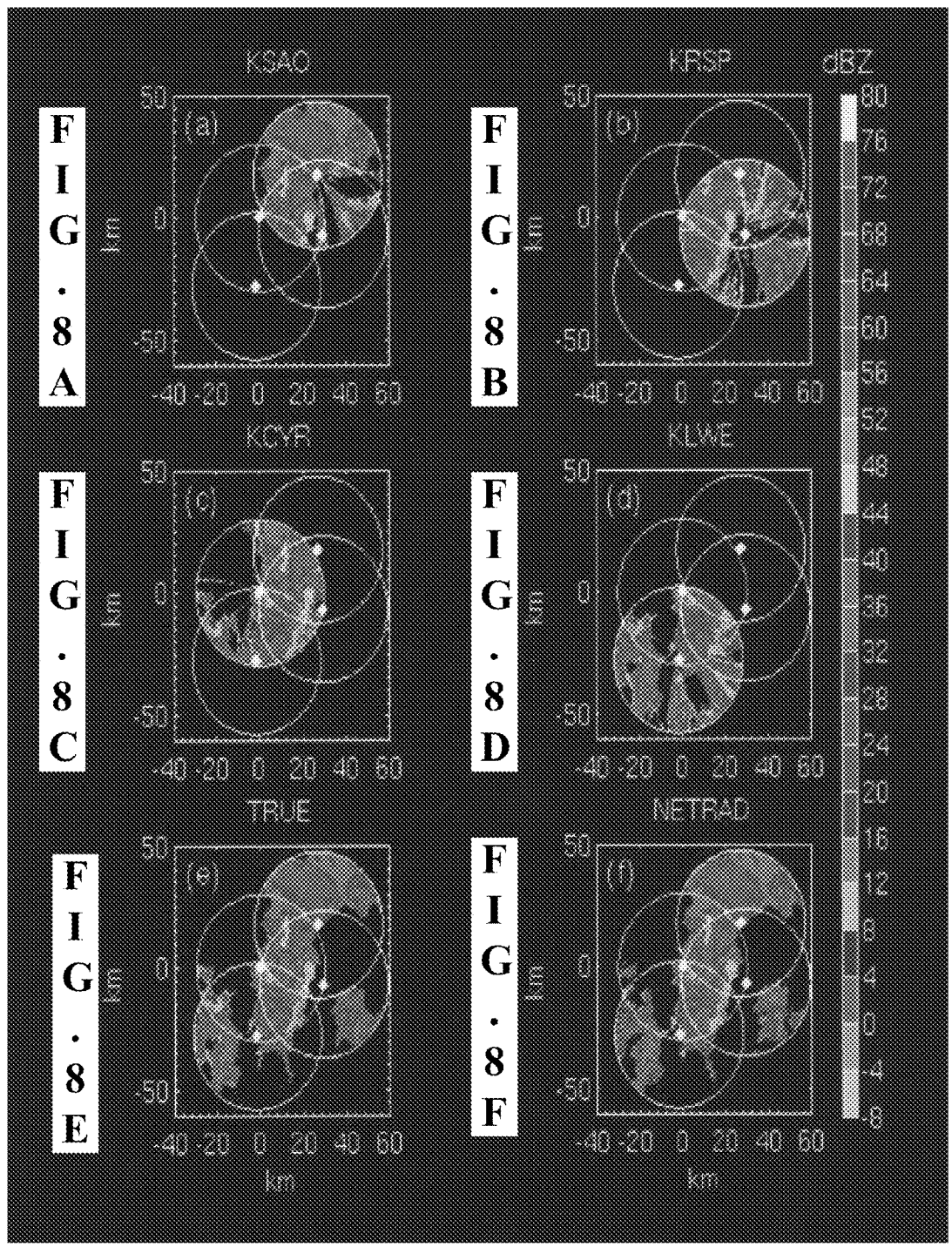
FIGS. 8A-E show true observed reflectivities by S-band radar to simulate short range radars which may be used with network waveform systems, in accordance with various embodiments.
FIG. 8F shows retrieved reflectivity from a network waveform based on the observed reflectivities in FIGS. 8A-E.

In FIGS. 8A-D, the true reflectivity observed by S-Band radar over a larger area is used to simulate the observations for the short range radars for one embodiment. The reflectivities at four nodes are contaminated from spatially independent overlaid echoes as seen in FIGS. 8A, B, C, and D. FIGS. 8E-F show that the retrieved reflectivity does not have the overlaid echoes and matches closely with the true reflectivity in the coverage area of the four node radar network for one embodiment. FIG. 8A shows measured reflectivity at Chickasha. FIG. 8B shows measured reflectivity at Rush. FIG. 8C shows measured reflectivity at Cyril. FIG. 8D shows measured reflectivity at Lawton. FIG. 8E shows the true reflectivity. FIG. 8F shows the retrieved reflectivities from a networked waveform.

Figure 9:
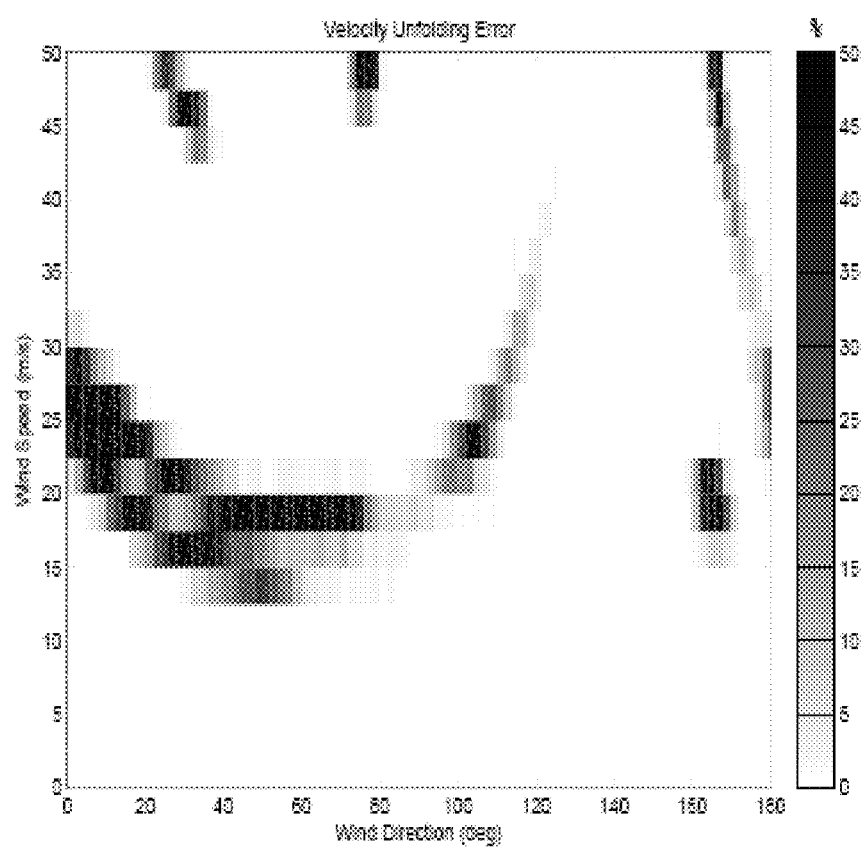
FIG. 9 shows velocity unfolding error as a function of wind speed and wind direction for a simulation of a network waveform system, in accordance with various embodiments.

In these simulations, the velocity unfolding error may be governed by the wind velocity vector and the distributed waveform design. The Doppler velocities measured at the nodes may be directly a function of the wind speed and the wind direction at the specific resolution volume. FIG. 9 shows the velocity unfolding error as a function of wind speed and wind direction for a specific resolution volume in the middle of the three nodes of the IP1 network for one embodiment. The resolution volume is located 20 km from Cyril radar at an azimuth of 60 deg. A significantly high variance of 1 m/s was used for the velocity error distribution. The region with very high velocity unfolding error in FIG. 9 occurs in conditions when the radial velocities at the nodes are closer to the Nyquist velocities of the waveform. However, the region with high errors may be much smaller than the region where the error is 5% or less and the overall velocity unfolding error is 3.5%. This limitation may be reduced by performing spatial filtering on the estimated wind field. Also, the region with higher errors may be reduced when a narrower error distribution is used. An average error may be obtained for the resolution volume for varying wind speeds and wind directions. The average unfolding error is a function of the location of the resolution volume within the radar network.

Figure 10A:
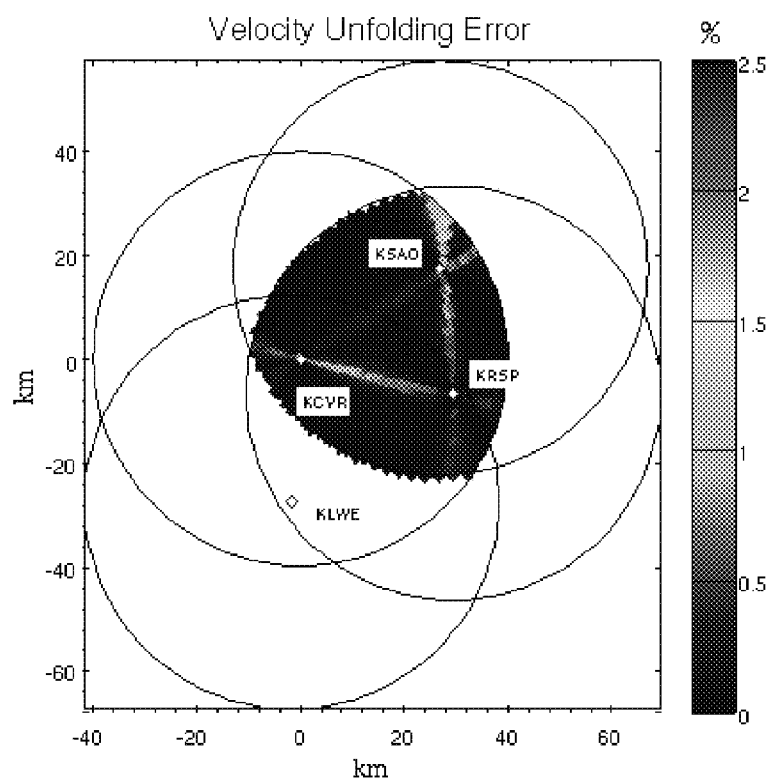
FIGS. 10A-B show velocity unfolding errors for a simulation of a three node and four node system, respectively, using a network waveform, in accordance with various embodiments.
Figure 10B:
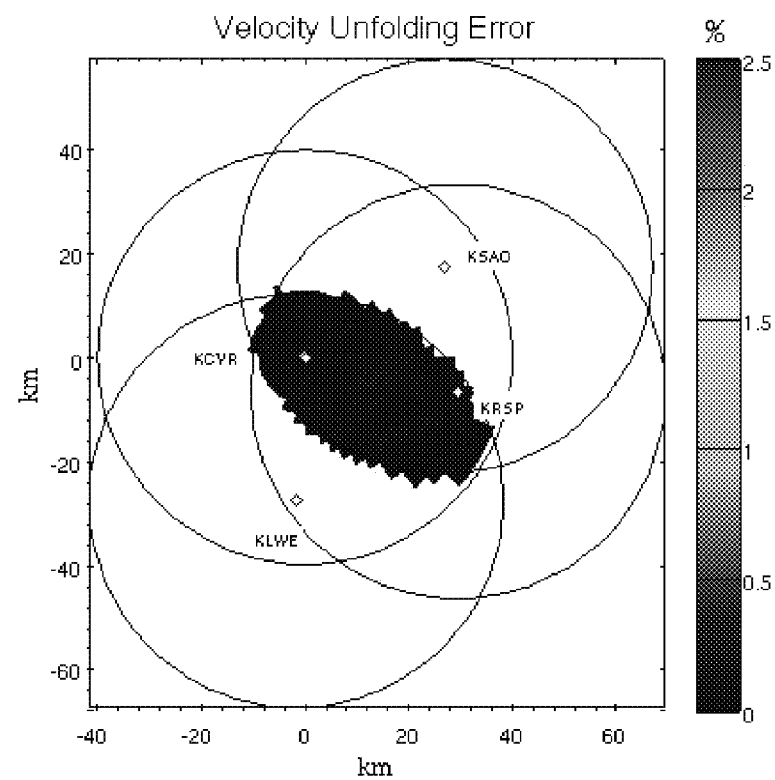

FIG. 10A shows the average unfolding error for a networked waveform using three radar nodes for one embodiment. It may be observed in FIG. 10A that the errors along the baseline of the radars may be high. One means to eliminate the high errors in the baseline region may be to use a network waveform with more radar nodes. For example, FIG. 10B shows a network waveform system implemented with four radar nodes for one embodiment. It may be observed in FIG. 10B that the base error between Cyril and Rush Springs may be eliminated. Therefore, in a large and dense network of radars, the higher error in the baseline may be eliminated using a networked waveform system.

The simulation performed by the inventors to analyze the ability of the networked waveform system to measure very high Doppler velocities utilized a Rankine model (Wood, V. T. and R. A. Brown, 1992: Effects of radar proximity on single-Doppler velocity signatures of axis symmetric rotation and divergence. *Monthly Weather Review*, 120, 2798-2807, herein incorporated by reference for all purposes) to model the horizontal wind fields within a tornado and may be used to simulate the velocity distributions that are measured in a networked environment for one embodiment. The Doppler velocity measured at the radar node is given by $$v_d = \left(\frac{r}{r_c}\right)^{\xi-1}\left[\frac{r_p}{r_c} - \frac{r_v}{r_c}\cos(\theta_p - \theta_v)\right]v_r + \left(\frac{r}{r_c}\right)^{\xi-1}\frac{r_v}{r_c}\sin(\theta_p - \theta_v)v_t$$

where $v_r$ is the peak radial velocity and $v_t$ is the peak tangential velocity at the center of vortex of radius $r_c$, $r_p$ and $r_v$ are the radar range of the resolution volume and vortex center respectively. $\theta_p$ and $\theta_v$ are the azimuth angles of the resolution volume and vortex center respectively; and r is the distance of the resolution volume from the center of vortex. For the simulations, $$\xi = \begin{cases} 1 & r \leq r_c \\ -1 & r > r_c \end{cases}$$

Figure 11A:
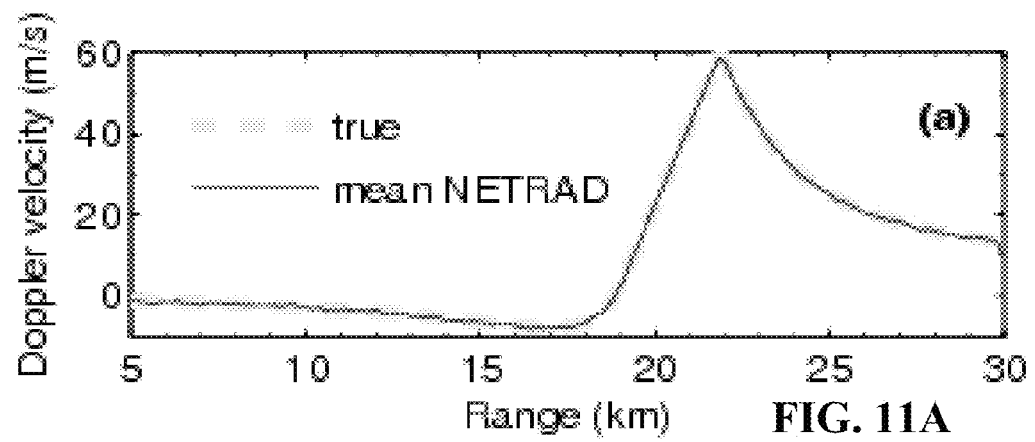
FIGS. 11A-C show measured velocities, standard deviations, and unfolding errors for a networked waveform simulation, in accordance with various embodiments.
Figure 11B:
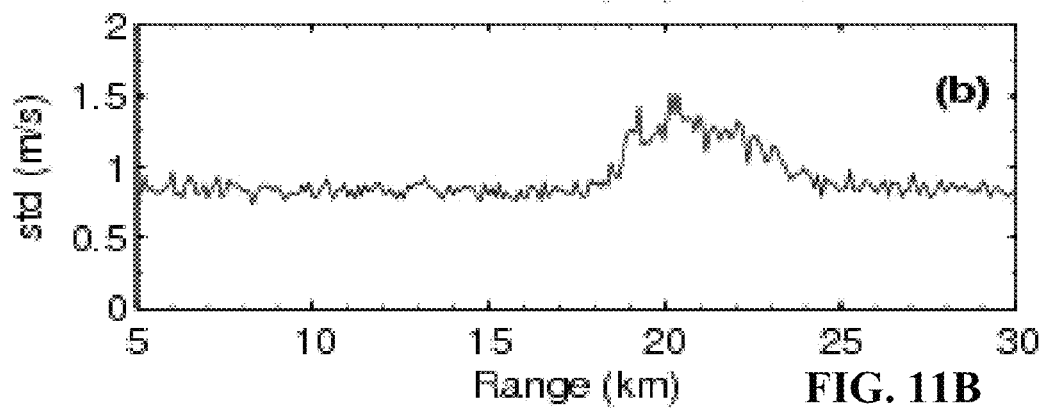
Figure 11C:
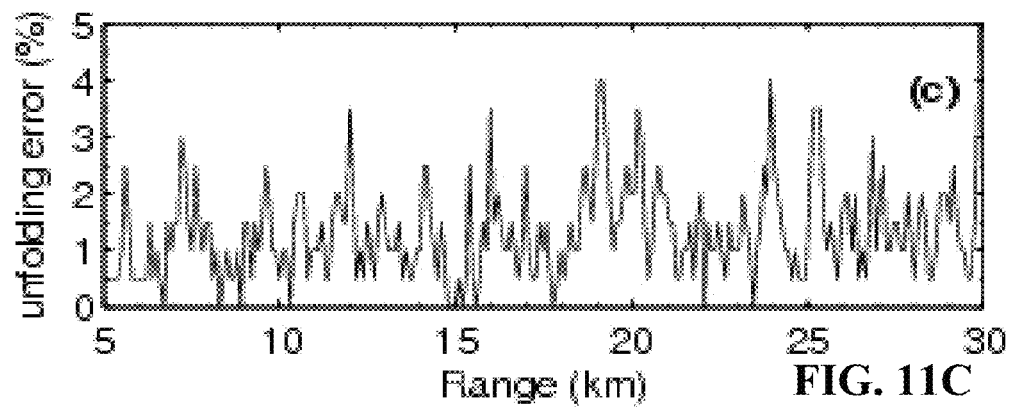

A range profile of Doppler velocity may be simulated based on the above Rankine model equation with a variance of 1 m/s in a networked radar environment with measurements made with a networked waveform such as U. It can be observed in FIG. 11A that unbiased velocities as high as 60 m/s can be measured with acceptable standard deviations as shown in FIG. 11B for one embodiment. The standard deviation of networked radar ("NETRAD") retrieval using a networked waveform is less than 1.5 m/s. FIG. 11C shows the unfolding error with NETRAD retrieval at Cyril for one embodiment. The unfolding error is less than 5% while being able to measure velocities as high as 60 m/s. The network waveform U used for the results shown in FIG. 11 was designed for low cost hardware. In this example, the networked waveform U included $u_1$ at KCYR, $u_2$ at KSAO and $u_3$ at KRSP, where $u_1$ waveform included 1.6 kHz and 1.84 kHz PRFs, $u_2$ waveform included 1.68 kHz and 1.92 kHz PRFs, and $u_3$ waveform included 1.76 kHz and 2.00 kHz PRFs.

U may be designed to measure velocities as high as ±100 m/s, and even higher in some embodiments. For example, in this simulation, the networked waveform U included $u_1$ at KCYR, $u_2$ at KSAO, and $u_3$ at KRSP, where $u_1$ waveform included 1.6 kHz and 2.08 kHz PRFs, $u_2$ waveform included 1.76 kHz and 2.24 kHz PRFs, and $u_3$ waveform included 1.92 kHz and 2.4 kHz PRFs. Referring back to related FIGS. 7A-D, these figures show Doppler velocity measurements of a tornado circulation simulated in the IP1 region based on the simulation. Networked waveform simulation with the IP1 radar network is at 1 degree elevation angle. FIG. 7A-B show measurements with the node waveform at Cyril, with FIG. 7A showing measured velocity using a pulse repetition frequency equal to 1.6 kHz and FIG. 7B showing measured velocity using a pulse repetition frequency of 1.84 kHz. FIG. 7C shows the true Doppler velocity at Cyril. The networked waveform retrieval is shown in FIG. 7D and it can be observed that the networked retrieval is able to measure high velocities around ±60 m/s.

Figure 12A:
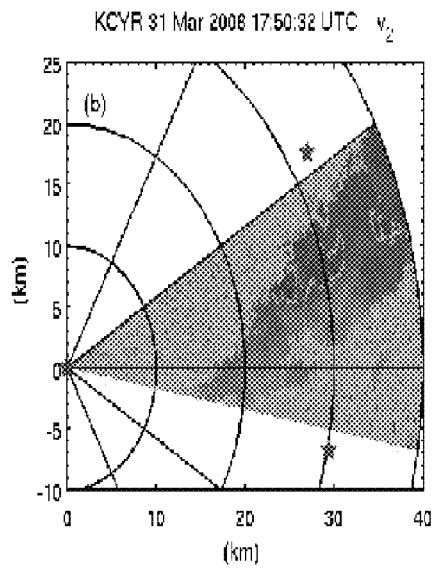
FIGS. 12A-D show reflectivity and velocity observations, along with retrieved velocity for a networked/distributed waveform for a precipitation event on Mar. 31, 2008, in accordance to various embodiments.
Figure 12B:
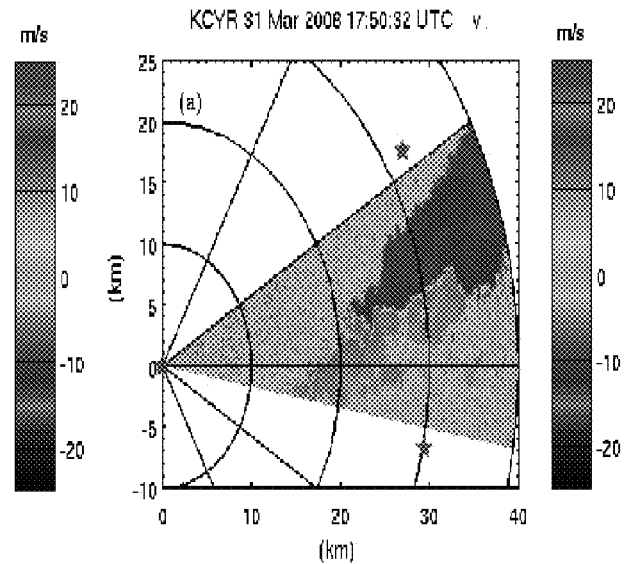
Figure 12C:
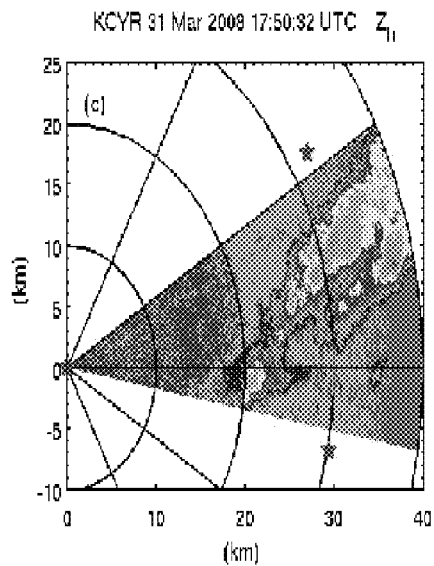
Figure 12D:
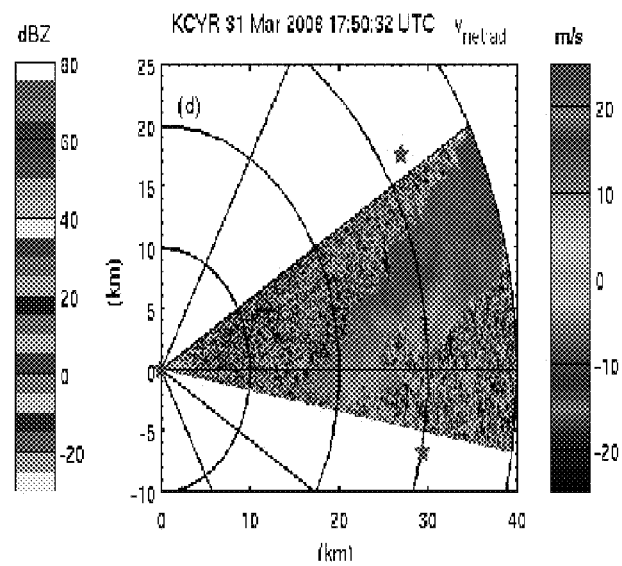

A network waveform system was tested by the inventors with data collected by an operational four-node radar network for one embodiment. The first generation CASA radar network is deployed in Oklahoma, and was also modeled in the simulation discussed above. The networked waveform system was implemented in the IP1 radar network, which consists of low cost X-band radars. A data set with the three nodes at Cyril, Chickasha and Rush Springs was collected on Mar. 31, 2008 at 17:50:32 UTC. IP1 radar network was set at 1 degree elevation angle. FIGS. 12A-D show a plan position indicator ("PPI") of networked retrieval for Cyril radar using a distributed waveform for one embodiment. The measured Doppler velocities are shown in FIG. 12A and FIG. 12B. In FIG. 12A, measured velocities at Cyril were made with a pulse repetition frequency at 1.6 kHz. In FIG. 12B, measured velocities at Cyril were made with a pulse repetition frequency 1.84 kHz. Velocity folding can easily be observed in the measured velocities. The measured reflectivity is shown in FIG. 12C. FIG. 12D shows the retrieval of Doppler velocity for Cyril using a distributed waveform. It can be observed that in the regions with adequate signal-to-noise ratio, the retrievals from distributed waveform may provide dealiased velocities. Although the Doppler velocities are not very high, the application of networked waveform systems may be applied to measure higher velocities, exceeding 60 m/s and even exceeding 100 m/s.

Figure 13A:
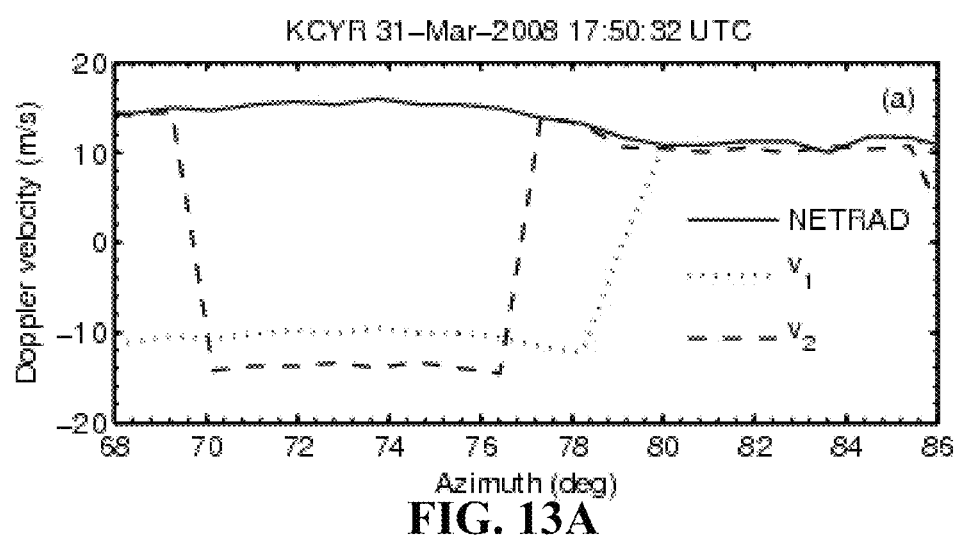
FIGS. 13A-B show measured Doppler velocity and reflectivity using a networked retrieval for a precipitation event on Mar. 31, 2008, in accordance with various embodiments.
Figure 13B:
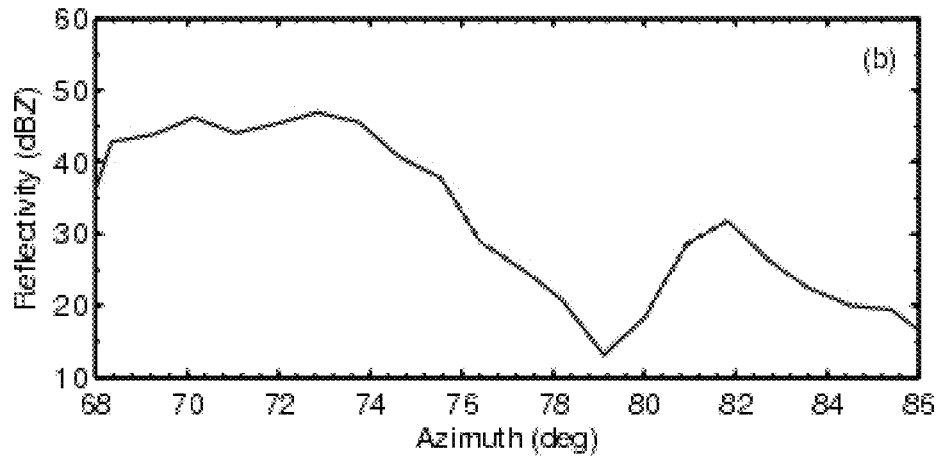

Additional information from the actual results is also shown in FIGS. 13A-B, which show the networked retrieval velocities and reflectivities for Cyril radar for one embodiment. The Doppler velocity and reflectivity are plotted versus azimuth in FIG. 13A and FIG. 13B, respectively.

FIG. 14A-D provide another view of the data discussed with respect to FIG. 12 and FIG. 13 for one embodiment. The measured Doppler velocities are shown in FIG. 14A and FIG. 14B. In FIG. 14A, measured velocities at Cyril were made with a pulse repetition frequency at 1.6 kHz. In FIG. 14B, measured velocities at Cyril were made with a pulse repetition frequency 1.84 kHz. Velocity folding can easily be observed in the measured velocities. The measured reflectivity is shown in FIG. 14C. FIG. 14D shows the retrieval of Doppler velocity for Cyril using a distributed waveform. It can be observed that in the regions with adequate signal-to-noise ratio, the retrievals from distributed waveform may provide dealiased velocities. The network waveform U used for the results shown in FIG. 14 was designed for low cost hardware. In this example, the networked waveform U included $u_1$ at KCYR, $u_2$ at KSAO and $u_3$ at KRSP, where $u_1$ waveform included 1.6 kHz and 1.84 kHz PRFs; $u_2$ waveform included 1.68 kHz and 1.92 kHz PRFs, and $u_3$ waveform included 1.76 kHz and 2.00 kHz PRFs.

Figure 15C:
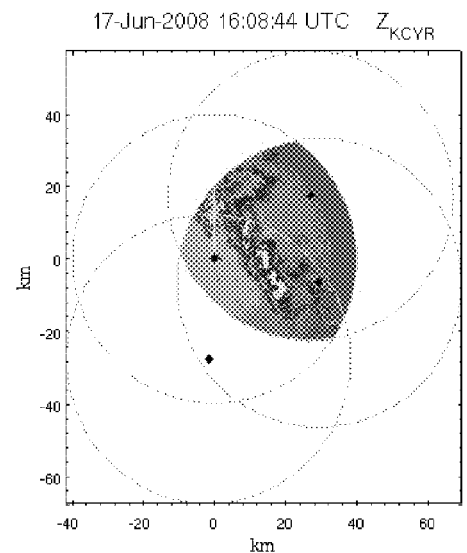
Figure 15D:
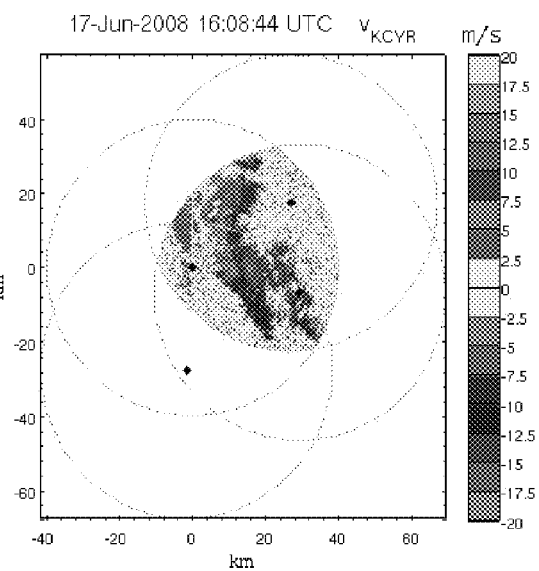

FIGS. 15A-D provide additional test results for networked waveform system, which was implemented in the IP1 radar network, which consists of low cost X-band radars for one embodiment. A data set with the three nodes at Cyril, Chickasha and Rush Springs was collected on Jun. 17, 2008 at 16:08:44 UTC. The measured Doppler velocities are shown in FIG. 15A and FIG. 15B. Velocity folding can easily be observed in the measured velocities. The measured reflectivity is shown in FIG. 15C. FIG. 15D shows the retrieval of Doppler velocity for Cyril using a distributed waveform. It can be observed that in the regions with adequate signal-to-noise ratio, the retrievals from distributed waveform may provide dealiased velocities. This implementation of a network waveform system with the IP1 radar network used network waveform U that included $u_1$ at KCYR, $u_2$ at KSAO, and $u_3$ at KRSP, where $u_1$ waveform included 1.6 kHz and 1.84 kHz PRFs, $u_2$ waveform included 1.68 kHz and 1.92 kHz PRFs, and $u_3$ waveform included 1.76 kHz and 2.00 kHz PRFs.

Circuits, logic modules, blocks, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

The previous description provides exemplary embodiments only, and is not intended to limit the scope, applicability, or configuration of the disclosure. Rather, the previous description of the exemplary embodiments will provide those skilled in the art with an enabling description for implementing one or more exemplary embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have also included additional steps or operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

While detailed descriptions of one or more embodiments have been give above, various alternatives, modifications, and

What is claimed is:

1. A networked waveform system for resolving radar measurement ambiguities, comprising:
 a plurality of radars disposed at different geographical positions within an environment and being configured to transmit a network waveform, wherein the network waveform includes a plurality of radar waveforms such that each radar waveform of the plurality of radar waveforms is transmitted by a specific radar of the plurality of radars;
 a computer system coupled with the plurality of radars including a processor and a memory, the memory being configured to store information including data received from the plurality of radars, data processed by the processor, and processing code executable by the process, wherein the processing code includes:
 instructions to receive output data from the plurality of radars resulting from the transmitted network waveform; and
 instructions to jointly process the output data from the plurality of radars to determine a measurement of the environment based on the network waveform.

2. The networked waveform system of claim 1, wherein the instructions to determine a measurement of the environment includes solving an optimization problem given by $\hat{w} = \arg \min_w \|Gw - \hat{v}_k\|^2$, where $\hat{v}_k$ is a measured Doppler velocity vector, $w=[u\ v]^T$ is a wind vector whose elements are velocity components in a horizontal plane, G is a geometric transformation relating the wind vector to the measured Doppler velocity, and $\hat{w}$ is a retrieved wind velocity vector.

3. The networked waveform system of claim 1, wherein each radar waveform of the plurality of radar waveforms includes at least one pulse repetition frequency.

4. The networked waveform system of claim 3, wherein at least a subset of the plurality of radars transmits a radar waveform including at least a second pulse repetition frequency.

5. The networked waveform system of claim 1, wherein the processor code further comprises instructions to transmit instructions to the plurality of radars to transmit a specific network waveform.

6. The networked waveform system of claim 1, wherein the measurement of the environment comprises a velocity measurement.

7. The networked waveform system of claim 6, wherein the processor code is configured to determine a velocity greater than 100 meters per second.

8. The networked waveform system of claim 1, wherein the measurement of the environment comprises a reflectivity measurement.

9. The networked waveform system of claim 1, wherein the processor code is configured to determine whether the transmitted waveform is a networked waveform.

10. The networked waveform system of claim 1, wherein at least one of the plurality of radars is at least one of an X-band radar, a monostatic radar, or a magnetron radar.

11. The networked waveform system of claim 1, wherein the processor code further comprises instructions to determine a dealiased wind field.

12. A method for resolving radar measurement ambiguities, comprising:
 transmitting a plurality of radar waveforms from a plurality of radars disposed at geographically different positions within an environment;
 receiving from the plurality of radars output data resulting from the transmitted plurality of radar waveforms, wherein at least a subset of the output data is aliased;
 processing the output data from the plurality of radars jointly;
 determining a dealiased measurement of the environment from the processed output data.

13. The method for resolving radar measurement ambiguities of claim 12, wherein determining a dealiased measurement of the environment includes solving an optimization problem given by $$\hat{w} = \arg \min_w \|Gw - \hat{v}_k\|^2,$$

where $\hat{v}_k$ is the measured Doppler velocity vector, $w=[u\ v]^T$ is a wind vector whose elements are velocity components in a horizontal plane, G is a geometric transformation relating the wind vector to the measured Doppler velocity, $\hat{w}$ is a retrieved wind velocity vector.

14. The method for resolving radar measurement ambiguities of claim 12, wherein the plurality of radar waveforms is a network waveform.

15. The method for resolving radar measurement ambiguities of claim 12, wherein the each radar waveforms of the plurality of radar waveforms includes at least one pulse repetition frequency.

16. The method for resolving radar measurement ambiguities of claim 15, wherein at least a subset of the plurality of radars is each configured to transmit a waveform including at least a second pulse repetition frequency.

17. The method for resolving radar measurement ambiguities of claim 12, further comprising transmitting instructions to the plurality of radars to transmit specific network waveform.

18. The method for resolving radar measurement ambiguities of claim 12, wherein the dealiased measurement is a velocity measurement.

19. The method for resolving radar measurement ambiguities of claim 18, wherein the dealiased measurement determines a velocity measurement at least 100 meters per second.

20. The method for resolving radar measurement ambiguities of claim 12, wherein the dealiased measurement is a reflectivity measurement.

21. The method for resolving radar measurement ambiguities of claim 12, wherein at least one of the plurality of radars is at least one of an X-band radar, a monostatic radar, or a magnetron radar.

22. The method for resolving radar measurement ambiguities of claim 12, further comprising determining a dealiased wind field from the processed output data.

* * * * *

UNITED STATES PATENT AND TRADEMARK OFFICE
CERTIFICATE OF CORRECTION

| | | |
|---|---|---|
| PATENT NO. | : 8,077,074 B2 | Page 1 of 1 |
| APPLICATION NO. | : 12/387845 | |
| DATED | : December 13, 2011 | |
| INVENTOR(S) | : Venkatachalam et al. | |

It is certified that error appears in the above-identified patent and that said Letters Patent is hereby corrected as shown below:

In the Claims:

Column 17, Claim 1, Line 23, please delete "process," and insert --processor,--.

Signed and Sealed this
Eighth Day of May, 2012

David J. Kappos
*Director of the United States Patent and Trademark Office*